United States Patent [19]

Hida et al.

[11] Patent Number: 4,697,877

[45] Date of Patent: Oct. 6, 1987

[54] SURFACE-COATED OPTICAL FIBER

[75] Inventors: Yoshinori Hida; Noriyuki Meguriya; Akira Yoshida, all of Gunma, Japan

[73] Assignee: Shin-Etsu Chemical Co., Ltd., Tokyo, Japan

[21] Appl. No.: 709,036

[22] Filed: Mar. 6, 1985

[30] Foreign Application Priority Data

Mar. 7, 1984 [JP] Japan ................................. 59-43531

[51] Int. Cl.$^4$ ................................. G02B 6/16
[52] U.S. Cl. ........................ 350/96.30; 350/96.34; 428/391; 525/478; 528/10; 556/465
[58] Field of Search ............... 350/96.29, 96.30, 96.31, 350/96.33, 96.34, 96.23; 427/163, 387; 428/391, 392, 375, 447; 65/3.41, 4.2; 525/478; 528/10, 12, 18, 30-33; 556/465, 439

[56] References Cited

U.S. PATENT DOCUMENTS 4,535,141  8/1985  Kroupa ........................ 528/31 X
4,599,438  7/1986  White et al. ..................... 556/439

FOREIGN PATENT DOCUMENTS 2038021  7/1980  United Kingdom ............. 350/96.33

Primary Examiner—John Lee
Attorney, Agent, or Firm—Wenderoth, Lind & Ponack

[57] ABSTRACT

The surface-coated optical fiber of the invention is composed of a fibrous body of a vitreous material, e.g. fused quartz glass, and a coating layer thereon formed of a coating composition comprising an organosiloxane-modified organic polymer, of which the backbone is formed of recurring organic units such as a polybutadiene, an acrylic polymer and the like having modifying pendant groups containing an organosiloxane unit. The workability of the coating composition in the coating application is excellent so that a high uniformity is obtained in the coating layer in comparison with a coating composition comprising an unmodified organic polymer. The coating layer thus formed has a remarkably improved mechanical strength over a coating layer formed of an organopolysiloxane resin alone.

6 Claims, No Drawings ced optical fiber of fused quartz glass used in the optical communication technology having a protective coating layer formed of a novel coating composition.

SURFACE-COATED OPTICAL FIBER

BACKGROUND OF THE INVENTION

The present invention relates to a surface-coated optical fiber or, more particularly, to an optical fiber of fused quartz glass used in the optical communication technology having a protective coating layer formed of a novel coating composition.

Although several different materials are proposed for optical fibers used in the optical communication technology including fused quartz glass, multi-component glass, plastic resins and the like, quartz glass-made optical fibers are primarily employed in view of the advantages of these fibers such as their light weight, low transmission loss, non-inductiveness, heat resistance, weathering resistance, high transmission capacity and the like. Such quartz glass-made optical fibers are typically provided with a surface coating layer to avoid possible damages on the surface by the use of various kinds of coating materials.

The coating composition used for the surface coating on quartz glass-made optical fibers should satisfy several requirements. For example, the coating layer formed of the coating composition should be usable over a wide temperature range without being affected by the changes in temperature and should be effective for the reinforcement and stress relaxation of the optical fibers. Further, the coating layer should be free from the problems of increased transmission loss due to microbending and noise generation due to light scattering. A coating material of the type preferred in these respects is a composition comprising a silicone, i.e. an organopolysiloxane resin. Organopolysiloxanes are advantageous as a coating material on quartz glass-made optical fibers in that these organopolysiloxanes exhibit good adhesion to the substrate surface with inherent affinity to vitreous materials by virtue of their chemical structure and excellent workability in the coating. This is due to the fact that the viscosity of these materials does not change significantly with temperature change. On the other hand, the organopolysiloxanes are defective in that coating films made of these materials exhibit relatively poor mechanical properties in so that the coating layer is sometimes broken or peeled from the substrate surface in the course of the application or in the subsequent post-treatment.

On the other hand, other types of coating materials practically used on quartz glass-made optical fibers include urethane acrylate, epoxy acrylate, polybutadiene acrylate and the like. These organic resins are, however, not quite satisfactory and have disadvantages such as low affinity to the surface of vitreous materials, difficulty in obtaining a viscosity suitable for the coating application and the temperature must be strictly controlled in the coating application because the viscosity of these materials are greatly dependent upon temperature.

SUMMARY OF THE INVENTION

An object of the present invention is therefore to provide a surface-coated optical fiber of which the coating material and the coating layer formed thereof are free from the above described problems and disadvantages in the prior art.

Thus, the surface-coated optical fiber provided by the invention comprises:

(a) a fibrous body made of a vitreous material; and
(b) a coating layer on the surface of the fibrous body formed of a coating composition comprising an organosiloxane-modified organic polymer having a molecular structure composed of a backbone of recurring organic units containing no silicon atoms and at least one pendant group on the backbone which is an organic group containing a unit represented by the general average unit formula $R_aSiO_{4-a/2}$, in which R is an atom or a group selected from the class consisting of a hydrogen atom, substituted or unsubstituted monovalent hydrocarbon groups, alkoxy groups and a hydroxy group and a is a positive number in the range of from 1 to 3.

DETAILED DESCRIPTION OF THE PREFERRED EMBODIMENTS

The above described surface-coated optical fiber is characterized by the use of a specific coating material hitherto not used for this purpose and the coating material exhibits an advantageous performance due to the combination of the organic polymer forming the backbone structure and the organosilicon-containing pendant moieties on the backbone, each compensating the drawbacks in the other. For example, the poor mechanical strength of the organopolysiloxane is improved by the organic polymer backbone while the poor workability of the organic polymer in the coating works is improved by providing the organopolysiloxane pendant groups thereon.

The organic polymer forming the backbone structure of the organosiloxane-modified polymer of the coating material may be any resinous organic polymer including thermoplastics, thermosetting and photocurable resins. Preferable polymers contain carboxyl groups —COOH, methylol groups —CH$_2$OH, vinyl groups —CH=CH$_2$, isocyanato groups —NCO, amino groups —NH$_2$, epoxy groups

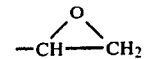

and the like functional groups. Exemplary of organic polymers suitable herein are butadiene polymers, saturated and unsaturated polyesters, polytetramethylene glycols, polypropylene glycols and epoxy resins as well as acrylate-modified products of these polymers.

The pendant group on the above named backbone polymer is an organic group containing an organosiloxane unit represented by the average unit formula $R_aSiO_{4-a/2}$, in which the symbols R and a each have the meaning as mentioned above. The substituted or unsubstituted monovalent hydrocarbon groups as a class of the group for R include alkyl groups such as methyl, ethyl, propyl, butyl and octyl groups, alkenyl groups such as vinyl and allyl groups, aryl groups such as phenyl and tolyl groups and cycloalkyl groups such as cyclohexyl and cyclopentyl groups as well as those substituted groups obtained by the replacement of a part or all of the hydrogen atoms in the above named hydrocarbon groups with substituents such as halogen atoms, cyano groups and the like. Exemplary of the alkoxy groups as another class of the group represented by R are methoxy and ethoxy groups. All of the groups denoted by R in the pendant group or in the molecule are not necessarily the same, and any combinations of different atoms and groups may be suitable.

The organic groups containing the above defined organosiloxane unit should preferably be bonded to the backbone molecule of the organic polymer through a silicone-to-carbon linkage between one of the silicon atoms in the organic group and a carbon atom in the backbone polymer. Several examples of the typical organic groups containing an organosiloxane unit are those expressed by the following formulas:

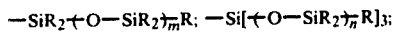

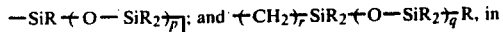

which the suffixes m, n, p, q and r are each a positive integer. In view of the compatibility with the organic polymer, these groups should preferably have a relatively small molecular weight or, in other words, the suffixes should not be excessively large. Particular examples of the organosiloxane-containing organic groups include those expressed by the following structural formulas, denoting a methyl and a propyl group with the symbols of Me and Pr, respectively:

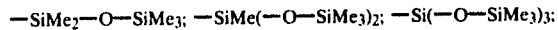

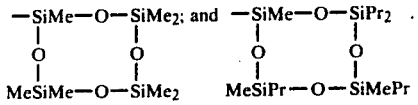

Optionally a part of the hydrogen atoms in the methyl and propyl groups of the above formulas may be replaced with hydroxy groups or hydrolyzable atoms and groups such as halogen atoms, alkoxy groups and the like.

The organosiloxane-modified organic polymer as the coating material used in the invention is obtained by forming a linkage between the backbone molecule of the organic polymer and the organosiloxane-containing organic group defined above through a silicon-to-carbon linkage. Such a silicon-to-carbon linkage can be formed by several different methods including, for example, an addition reaction between an ethylenically unsaturated bond in a polybutadiene polymer and a hydrogen atom directly bonded to the silicon atom in an organosilicon compound, by the copolymerization of an acrylic or methacrylic acid as well as esters thereof and an organosilicon compound having a group of the formula $CH_2=CMeD—CO—O—C_3H_6—$ bonded to the silicon atom, and by a ring-opening addition reaction between an epoxy group of an epoxy resin and a 3-aminopropyl group bonded to the silicon atom in an organosilicon compound and the like.

The degree of modification of the organic polymer with the organosiloxane-containing organic groups should be in such a range that 100 parts by weight of the organic polymer is modified with from 10 to 100 parts by weight or, preferably, from 20 to 200 parts by weight of the organic groups. When the degree of modification is larger than the above range, the resultant coating layers formed of the modified organic polymer may have a relatively low mechanical strength so that the coating film is sometimes broken in the course of the coating operation. When the degree of modification is smaller than the above range, on the other hand, a disadvantage is caused that the coating material has poor workability in the coating application.

The introduction of the modifying organic groups into the backbone organic polymer may be performed prior to the formation of the coating with the coating material or, optionally, may be performed simultaneously with the curing of the coating film on the substrate surface depending on the types of the modifying organic groups and the nature of the backbone organic polymer to be modified therewith. Optionally the coating composition comprising the organosiloxane-modified organic polymer may be admixed with a reaction initiator, a catalyst and the like and with additives such as an organic peroxide, a photosensitizer and the like according to need, as well as fillers, such as finely divided silica power, e.g. fumed silica, titanium dioxide, aluminum oxide and the like, as well as carbon black.

In the following, the present invention is described in more detail by way of examples, in which the expression of "parts" always refers to "parts by weight".

EXAMPLE 1

Into a reaction vessel there was introduced 112.5 g of a highly viscous poly(1,2-butadiene) acrylic-modified at the molecular chain ends and having an average molecular weight of about 2600 (Nisso PB TE-2000, a product by Nippon Soda Co.), 200 g of pentamethyl disiloxane and 600 g of toluene to form a reaction mixture followed by adding an admixture of 0.5 g of a solution of chloroplatinic acid in 2-ethylhexyl alcohol in a concentration of 2% by weight as platinum and 0.1 g of an antioxidant (Antage BHT, a product by Kawaguchi Chemical Co.). The mixture was agitated for 4 hours at 100° to effect an addition reaction. After completion of the reaction, the toluene and unreacted pentamethyl disiloxane were removed from the reaction mixture by distillation under reduced pressure. The thus obtained reaction product was identified to be an addition product in which the pentamethyl disiloxane had added to about 90% of the ethylenic double bonds in the starting polybutadiene.

In the next place, a coating composition for optical fibers was prepared by admixing 100 g of the above obtained reaction product with 1 g of benzoin isobutyl either as a photosensitizer and a quartz glass fiber having a diameter of 0.125 mm was coated with the coating composition at room temperature in a thickness of 0.10 mm by passing through a coating die having an opening of 0.4 mm diameter at a velocity of 30 m/minute. The coating film on the substrate coming out of the coating die was immediately cured by irradiating with ultraviolet light from an ultraviolet irradiation apparatus at a distance 10 cm apart from the running fiber to give a quartz glass-made optical fiber uniformly coated on the surface with the organosiloxane-modified polybutadiene.

Separately, the same photocurable composition as used above was shaped and photocured in the same manner as above but at a running velocity of 10 m/minute into a sheet-like form having a thickness of 2 mm and the tensile strength thereof was determined according to the procedure specified in JIS K 6301 to be 10 kg/cm².

For comparison, a comparative coating composition was prepared by admixing 100 g of the same poly(1,2-butadiene) as used above with 1 g of benzoin isobutyl ether, but without the addition reaction of pentametyl disiloxane and used for coating the quartz glass-made optical fiber. In this case, the consistency of the composition was too high at room temperature so that the coating application could be performed only by heating the composition at 80° C.

Although a cured sheet of this comparative composition having a thickness of 2 mm had a tensile strength as high as 40 kg/cm$^2$, the coating film on the quartz glass fiber was not uniform and on the surface rugged due to the poor spreadability of the composition over the surface of the vitreous materials.

EXAMPLE 2

The experimental procedure was substantially the same as in Example 1 except that the amount of pentamethyl disiloxane was decreased so that the pentamethyl disiloxane had added to about 50% of the ethylenically unsaturated bonds in the starting polybutadiene. The coating film of the composition formed on a quartz glass fiber of 0.125 mm diameter had a uniform thickness with no peeling of the film during the coating application. A cured sheet of the composition having a thickness of 2 mm had a tensile strength of 15 kg/cm$^2$.

EXAMPLE 3

The experimental procedure was substantially the same as in Example 1 except that the pentamethyl disiloxane was replaced with 1,3,5,7-tetramethyl-3,5,7-tripropyl cyclotetrasiloxane and the amount of the siloxane compound mixed with the polybutadiene was controlled so that the siloxane compound had added to about 50% of the ethylenically unsaturated bonds in the starting polybutadiene. Coating of a quartz glass fiber of 0.125 mm diameter was performed using the coating composition in the same manner as in Example 1 to give a surface-coated optical fiber having a coating film of uniform thickness without peeling of the film during the coating application. A cured sheet of the composition having a thickness of 2 mm had a tensil strength of 20 kg/cm$^2$.

EXAMPLE 4

A coating composition was prepared by uniformly blending 50 parts of butyl methacrylate, 6 parts of N-vinylpyrrolidone, 4 parts of ethyleneglycol dimethacrylate, 40 parts of 3-methacryloxypropyl tris(trimethylsiloxy) silane and 3 parts of benzophenone. A quartz glass fiber of 0.125 mm diameter was coated using this coating composition in the same manner as in Example 1 except that the velocity of the fiber passing through the coating die was 15 m/minute followed by curing of the composition with ultraviolet irradiation to give a surface-coated optical fiber of which the adhesion of the coating film to the substrate surface was excellent and the coating layer had a uniform thickness.

For comparison, a comparative coating composition was prepared with the same formulation as above except the amount of butyl methacrylate was increased to 90 parts and the organosilicon compound omitted. A quartz glass fiber was coated with this comparative coating composition in the same manner as above and it was found that the surface of the coating layer was not uniform due to the poor spreadability of the composition over the surface of the vitreous materials.

EXAMPLE 5

A coating composition was prepared by uniformly blending 40 parts of 3-methacryloxypropyl tris(trimethylsiloxy) silane and 3 parts of benzophenone with 60 parts of a reaction product of the same poly(1,2-butadiene) as used in Example 3 and 1,3,5,7-tetramethyl-3,5,7-tripropyl cyclotetrasiloxane prepared in the same manner as in Example 3, in which the siloxane compound had added to about 20% of the ethylenically unsaturated bonds in the starting polybutadiene. A quartz fiber of 0.125 mm diameter was coated using this coating composition to give a surface-coated optical fiber of which the adhesion of the coating film to the substrate surface was excellent and the thickness of the coating layer was uniform.

What is claimed is:

1. A surface-coated optical fiber which comprises: (a) a fibrous body made of a vitreous material; and (b) a coating layer on the surface of the fibrous body formed of a coating composition comprising an organosiloxane-modified organic polymer having a molcular structure composed of a backbone of recurring organic units having no silicon atoms and at least one pendant group on the backbone which is an organic group containing a unit represented by the general average unit formula $R_aSiO_{4-a/2}$, in wich R is an atom or a group selected from the class consisting of a hydrogen atom, substituted or unsubstituted monovalent hydrocarbon groups, alkoxy groups and a hydroxy group and a is a number of the range from 1 to 3.

2. The surface-coated optical fiber as claimed in claim 1 wherein the fibrous body of a vitreous material is a fused quartz glass fiber.

3. The surface-coated optical fiber as claimed in claim 1 wherein the group denoted by R is a methyl group or a propyl group.

4. The surface-coated optical fiber as claimed in claim 1 wherein the unit represented by the general average unit formula is bonded to the backbone of the recurring organic units through a silicon-to-carbon linkage.

5. The surface-coated optical fiber as claimed in claim 1 in which said pendant groups are present in an amount of 10 to 100 parts per 100 parts of the backbone of the organosiloxane-modified organic polymer.

6. The surface-coated optical fiber as claimed in claim 1 in which said pendant groups are present in an amount 20 to 200 parts per 100 parts of the backbone of the organosiloxane-modified organic polymer.

* * * * *